United States Patent [19]

McKenna et al.

[11] Patent Number: 4,546,382
[45] Date of Patent: Oct. 8, 1985

[54] TELEVISION AND MARKET RESEARCH DATA COLLECTION SYSTEM AND METHOD

[75] Inventors: William J. McKenna, Barrington; Kenneth W. Silvers, Frankfort, both of Ill.; Rand B. Nickerson, Scarborough; Russell J. Welsh, Toronto, both of Canada; Harold R. Walker, Edison, N.J.; Joseph A. Cullity, Jersey City, N.J.; Bohdan Stryzak, Bridge Water, N.J.

[73] Assignee: CTBA Associates, Cincinnati, Ohio

[21] Appl. No.: 559,459

[22] Filed: Dec. 8, 1983

Related U.S. Application Data

[63] Continuation-in-part of Ser. No. 502,654, Jun. 9, 1983.

[51] Int. Cl.$^4$ .............................................. H04N 7/02
[52] U.S. Cl. ................................... 358/84; 179/2 AS; 358/86; 455/2
[58] Field of Search ............. 179/2 AS, 2 AM, 2 CA; 358/84, 86; 455/2; 235/383

[56] References Cited

U.S. PATENT DOCUMENTS

| | | | |
|---|---|---|---|
| 3,987,397 | 10/1976 | Belcher et al. | 455/2 |
| 4,163,254 | 7/1979 | Block et al. | 358/84 X |
| 4,258,386 | 3/1981 | Cheung | 179/2 AS X |
| 4,331,973 | 5/1982 | Eskin et al. | 358/84 |
| 4,331,974 | 5/1982 | Cogswell et al. | 358/84 |
| 4,361,851 | 11/1982 | Asip et al. | 358/84 |
| 4,394,540 | 7/1983 | Willis et al. | 179/2 AM |
| 4,404,589 | 9/1983 | Wright, Jr. | 358/86 |
| 4,503,288 | 3/1985 | Kessler . | |

FOREIGN PATENT DOCUMENTS 57-113673  7/1982  Japan ............................... 179/2 AS Primary Examiner—Keith E. George
Attorney, Agent, or Firm—Sherman O. Parrett

[57] ABSTRACT

A data gathering system includes a plurality of remote units which are controlled from a central location. Each of the remote units is attached to a television receiver which is generally but not necessarily attached to a cable system. Each of the remote units functions to determine which of several TV modes is in use as well as to store TV channel selector data and data from an optical input device. All this data is stored for later transmission by each of the remote units to a central data collecting point. A video message for a TV viewer, such as a survey, may be transmitted from the central location and stored at the remote units, for later display on the TV receiver associated with the remote units. Substitution of alternate programming information may also be achieved by the central control point on selected of the remote units.

27 Claims, 15 Drawing Figures

INITIALIZE MEMORY POINTERS

CONNECT UART TO DATAWAND INTERFACE

READ ONE CHARACTER & STORE IN MEMORY

LAST CHARACTER?

RTS

TIME TO OPEN WINDOW?

OPEN WINDOW

TIME TO CLOSE WINDOW?

CLOSE WINDOW

FETCH COMMAND

DECODE COMMAND

COMMAND DISPATCH

BYE COMMAND?

RTS

TELEVISION AND MARKET RESEARCH DATA COLLECTION SYSTEM AND METHOD

CROSS REFERENCES TO RELATED APPLICATIONS

The present application is a continuation-in-part application of application Ser. No. 502,654, filed June 9, 1983 for a Television Viewer Data Collection System, and assigned to the Assignee of the present invention.

BACKGROUND OF THE INVENTION

The present invention relates to data storage and transmission systems and more particularly relates to monitoring systems for accumulating data at remote locations and transmitting the data to a central location. More particularly, the present invention relates to a data collection system and method for collecting at remote panelist locations data relative to television viewing habits and preferences as well as product purchases and preferences of a plurality of panelists, and transmitting the collected data to a central location. In accordance with one embodiment of the present invention, a data collection system is provided in which individual television receivers may be controlled from a central location to display substitute programming.

The prior art is replete with various systems and arrangements for monitoring viewing habits of television viewers. The earliest such systems merely collected data on site for eventual manual collection as to the television channels viewed and the times of viewing for various panels of viewers in order to determine market share and ratings of various television programs. Later, systems came into being for use with cable television systems with two way communications over the cable system between the head end thereof and various cable subscribers. In such a system the television sets are typically interrogated periodically from this central location over the cable, with the channel selection and time information being sent back to the central location and logged for statistical compilation. Such systems have also been used in the past in so-called pay television systems in which billing information is sent over the cable system to a central location from the various subscribers to the pay television system. The prior art also includes such systems in which a memory means is provided at the remote location, i.e. at the television receiver, for accumulating data as to the channel being viewed and time. The accumulated data is then periodically transmitted over conventional telephone lines from the remote locations to the central location, by telephone calls initiated by either the remote stations or the central location.

Systems for remotely accumulating data regarding the habits of television viewers and their qualitative reaction to material have today become important from the standpoint of market research. For example, the effectiveness of television commercials can be monitored by correlating viewing of those commercials with subsequent purchase decisions made by panelists whose viewing habits are being monitored. One manner of achieving this which has been utilized in the past is to have the cooperating panelists keep a diary as to purchase of products. The purchase information recorded in these diaries is then correlated with the commercials viewed by those cooperating panelists. In an alternative arrangement disclosed in the prior art, in areas where universal product code automated check-outs are available, such as grocery stores and the like, a panelist makes his or her purchases and at the check-out counter presents a card coded with a unique scanner panelist identification similar to the universal product code symbol on the products purchased. The store's computer can automatically retain such purchase data for subsequent transfer to a market research company computer data base for correlation with the data regarding the various panelists viewing of commercials. Such arrangements of course require cooperation of stores within the area of the panelist locations, and are therefore more suited for limited geographic groupings of panelists in a single locale or city, and are not readily applicable to a national assemblage of panelists extending across an entire country.

In market research relating to commercials and their effectiveness, it also is sometimes important to evaluate the effectiveness of alternative forms of a commercial. One way of achieving this in the context of a cable television system is to split the subscribers or panelists into two or more groups, and then show the alternative forms of commercials to the respective groups of panelists. Correlation of product purchase information regarding those panelists with the forms of the commercials they viewed can then be used to assess the effectiveness of the various alternative forms of the commercial. The prior art also includes examples of systems wherein certain portions of a viewing audience can be selected on a dynamic basis and furnished with substitute programming. Such a system is disclosed, for example, in U.S. Pat. No. 3,639,686 to Walker et al. In accordance with that system, an auxiliary television signal is broadcast which contains not only substitute programming, i.e. video signal information, but also control information such as pulse code information for remotely selecting panelists which are to receive the substitute programming. Digital address information is provided for each of the panelists, and the portion of the panelists which are to receive the substitute programming are selected by the pulse code information. The Walker et al patent notes that in selecting the panelists which are to receive the substitute programming, the number of categories available is dependent on the number of digital information bits that are incorporated in the system. A later U.S. Pat. No. 4,331,974 to Cogswell et al also discloses an arrangement for selecting portions of a viewing audience on a dynamic basis and furnishing those portions with substitute programming.

The present invention relates to an improved system and method which is of particular utility in market research type applications, but which is not limited thereto.

OBJECTS AND SUMMARY OF THE INVENTION

It is an object of the present invention to provide a system and method for collecting at remote panelists locations data relative to those panelists, and transmitting the collected data to a central location.

It is another object of the present invention to provide such a data collection system for collecting data relative to panelists' television viewing habits and preferences as well as market research data regarding panelists' product purchases and preferences.

It is another object of the present invention to provide such a system and method in which the remote locations are provided with memory for storing collected data, with collected data being periodically transmitted to a central location over non-dedicated telephone lines.

It is still another object of the present invention, in accordance with one embodiment, to provide such a system and method in which substitute programming can be provided to selected of the panelists.

Briefly, in accordance with one embodiment of the invention, a remote data collection unit is provided at each of a plurality of panelist locations. The remote unit is adapted to be coupled to one or more television receivers at each panelist location, or to one or more cable television converters in the context of a cable television system. The data collection unit includes a memory and means for monitoring and storing information regarding which of a plurality of television modes are in use, as well as viewer identification data. Means are provided to monitor and store television events concerning television viewing, such as channel changes or the like. Further, the data collection unit includes means for optically scanning bar codes and the like and storing information regarding same. Such bar codes and the like can be representative of product purchase information or panelist responses to market research surveys and the like. Periodically, telephone communication is established between a central location and each of the remote units, and the contents of each data collection unit memory are transmitted to the central location. In accordance with one embodiment of the invention, during telephone communication between the central location and a remote unit, questionnaires can be downloaded from the central location to the memory of a remote data collection unit. Such questionnaires can be displayed on a television receiver coupled to the remote data collection unit, with means provided for a viewer or panelist registering answers to questions in the questionnaire, and the memory of the remote data collection unit storing the answers to the questions for transmission to the central location at the next telephone communication therewith.

In accordance with one aspect of the invention, a viewer control is associated with each remote data collection unit. The viewer control includes a television channel selector, which can be utilized not only in a normal mode for selecting channels but also to place the unit in a channel lock or a non-channel lock position. When the data collection unit is in the channel lock position, the television set associated therewith stays tuned to whatever channel was previously selected, but subsequent changes in the channel selector are stored in the data collection unit memory. This feature is useful for recording data relating to viewer response, individual viewer identification, responses to questionnaires and the like.

In accordance with one embodiment of the invention, substitute programming information may be supplied to each of the panelist locations, as by transmission over an otherwise unused channel in a cable system. Control information is also transmitted along with the substitute programming, with the control information being utilized to select on a dynamic basis portions of the panelists for receipt of substitute programming. The groups of panelists which are to receive the substitute programming information can be selected on a demographic basis or the like.

Other objects, advantages, and features of the present invention will appear from the detailed description of the preferred embodiments thereof, taken in conjunction with the accompanying drawings.

DETAILED DESCRIPTION OF THE PREFERRED EMBODIMENTS

The present invention relates to a data gathering system which includes a plurality of remote units which are controlled from a central location. Each of the remote units is attached to a television receiver which is generally but not necessarily attached to a cable system. Each of the remote units functions to determine which of several TV modes is in use as well as to store TV channel selector data and data from an optical input device. All this data is stored for later transmission by each of the remote units to a central data collecting point. In accordance with some embodiments of the invention, a video message for a TV viewer can be transmitted from the central location and stored at the remote units, for later display on the TV set associated with the remote units. Further embodiments of the invention allow for substitution of alternate programming information by the central control point on selected of the remote units.

Figure 1:
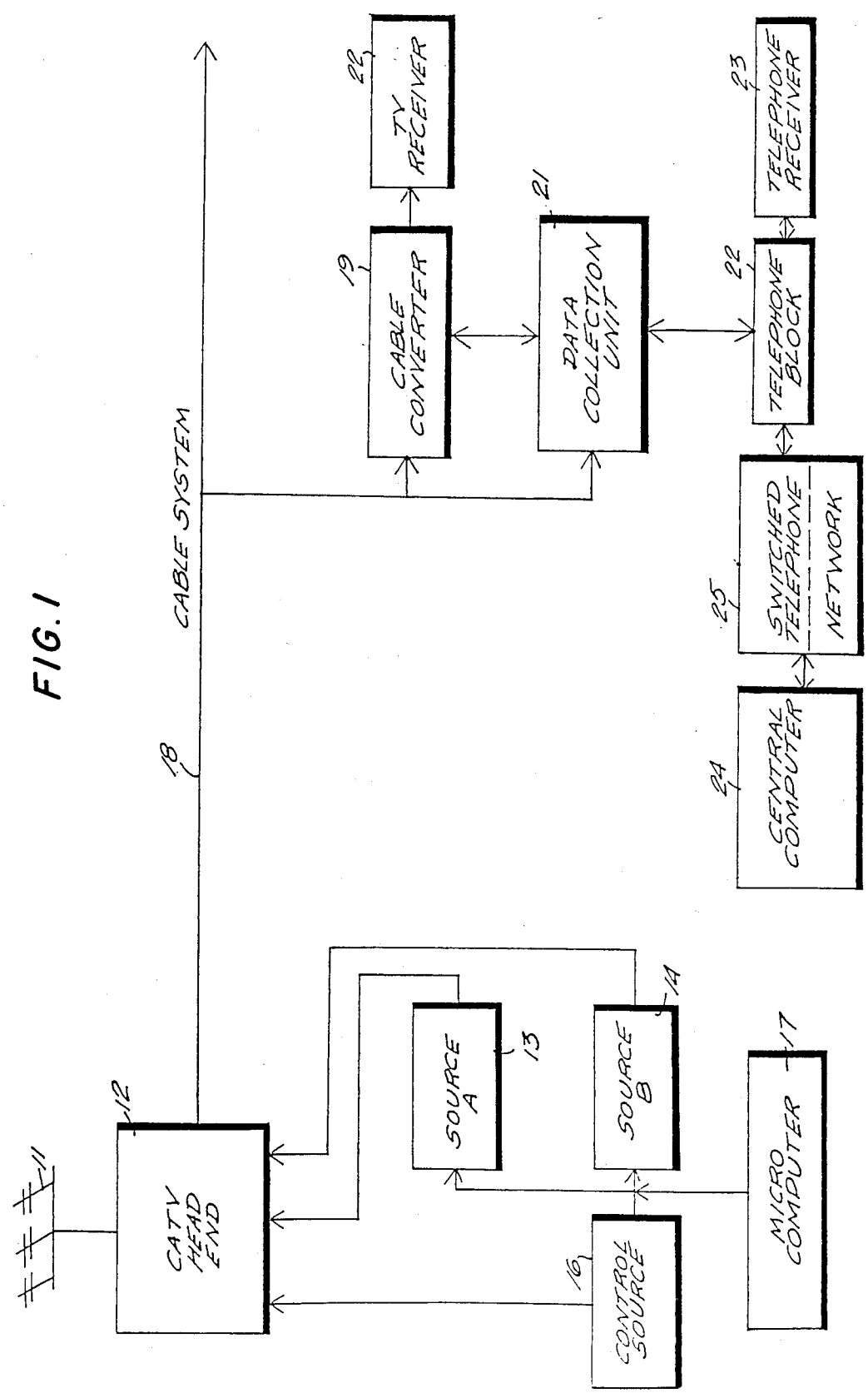
FIG. 1 is a block diagram illustrating an overall system in accordance with the principles of this invention.

Referring to FIG. 1, there is shown a block diagram of the overall system. In accordance with the embodiment shown in FIG. 1, the system is illustrated in the context of a cable TV system; the invention is not necessarily limited thereto, however. In FIG. 1 signals on normal television channels are received by head end antennas 11 associated with a CATV head end control system 12. The signals from the normal television channels can be mixed with videotape or film sources from auxiliary sources 13 and 14. In accordance with the invention, a control source 16 is also provided for transmitting digital data from and under the control of a microcomputer 17. These will be discussed in more detail later.

All of these various signals are mixed in the CATV head end 12 and transmitted over a cable system, generally indicated by reference numeral 18.

FIG. 1 illustrates one of the remote units of this system of this invention, although it should be understood that a plurality of such remote units are provided, suitably situated in homes of panelists or the like who have agreed to serve on panels. As shown in FIG. 1, a cable converter 19 and a data collection unit 21 as provided in accordance with the present invention are both coupled to the cable system 18. A normal television receiver 22 is coupled to the cable converter 19. There is also interconnection for passage of control signals both ways between the data collection unit 21 and the cable converter 19. This is explained in more detail later.

In accordance with the invention, the data collection unit 21 contains a memory, and stores data as to which of a plurality of TV modes are in use, which TV channel is being viewed, as well as input from a suitable optical scanning device, which will be discussed in more detail later. In accordance with some embodiments of the present invention, other data can be collected by the data collection unit, such as viewer qualitative rating of programs and responses to survey questionnaires and the like.

The data collection unit 21 is interconnected to a telephone block 22, through which incoming and outgoing telephone calls are coupled to the panelist's home with suitable wiring and the like interconnecting telephone receivers 23 in the panelist's home.

A central data collection point is provided for the system in accordance with this invention, which need not be the same central location as the CATV head end 12. The central location is indicated in FIG. 1 by the central computer 24. The central location can include an appropriate computer with modems and the like for making connection over the switched telephone network 25 to each of the remote locations. This is illustrated in FIG. 1 by the connection between the switched telephone network 25 and the telephone block 22 for the particular remote location shown in FIG. 1. Periodically, the central computer 24 "dials-up" each of the remote locations, establishes appropriate telephone communications with each of the data collection units 21, and the data stored in each of the data collection units 21 is transmitted via the switched telephone network 25 to the central computer 24. While in telephone communication, in addition to extracting the stored data from the data collection unit 21, the central computer 24 can also download via the telephone lines data into each of the data collection units 21, as discussed in more detail hereafter. Also as discussed in more detail hereafter, in accordance with one aspect and embodiment of the invention, appropriate interconnections are provided in the telephone block 22 so that when a telephone call comes in from the central computer 24, the call is routed to the data collection unit 21, and does not activate the telephone receivers 23 in the panelist's home.

Figure 2:
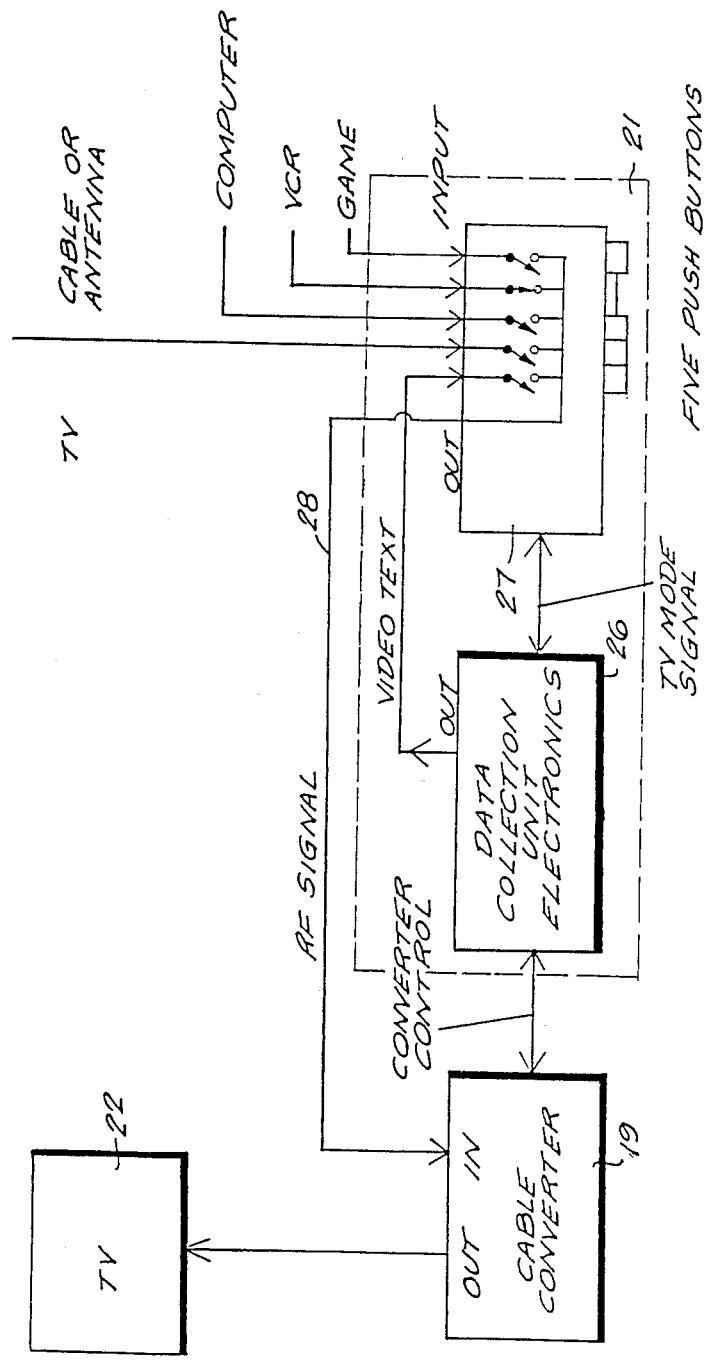
FIG. 2 is a block diagram illustrating signal flow in accordance with the present invention.

Referring now to FIG. 2, there is shown an additional block diagram illustrating signal paths between the data collection unit 21, the cable converter 19, and a television receiver 22. Referring to FIG. 2, the data collection unit 21 includes an electronics portion 26 and a switching portion 27. The switching portion 27 consists of a number of switches, five in the embodiment shown in FIG. 2, for selecting which of a variety of TV modes are to be utilized. Thus, for example in the embodiment shown in FIG. 2 the inputs to the switching portion 27 are the normal TV signal from a cable or antenna, along with an interconnection to a computer, i.e. home computer, a VCR, and a game. Depression of one of the five pushbuttons in the switching portion by a viewer or panelist selects one or the other of these TV modes. A TV mode signal corresponding to and indicative of one of these TV modes is stored in the data collection unit electronics section 26. As was briefly discussed in connection with the block diagram of FIG. 1, in accordance with one embodiment of the invention text information, such as survey questionnaires and the like, can be downloaded from a central location over the telephone lines and stored in the data collection unit electronics 26. Selection of a "survey" function by the panelists, actuates this TV mode and video text information is coupled through the corresponding switch in the switching portion 27 and coupled over RF signal line 28 to the input of the cable converter 19. The output of the cable converter 19 is of course suitably connected to the television receiver 22.

In accordance with the present invention, control information is coupled both ways between the cable converter 19 and the data collection unit 26. In fact, in accordance with the present invention, and as described more fully hereinafter, it is the data collection unit electronics 26 which controls the television program material displayed on the television receiver 22, rather than the cable converter 19.

Figure 3:
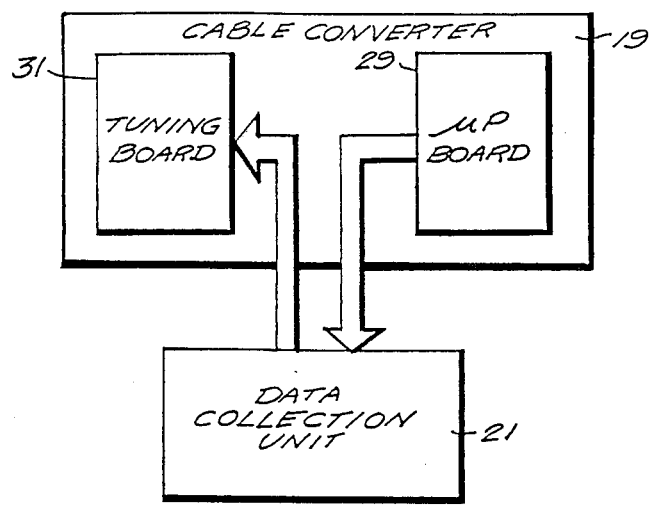
FIG. 3 is a block diagram illustrating modification of a cable converter in accordance with the present invention.

Referring to FIG. 3, there is shown a typical example of the way in which cable converters are modified in accordance with the present invention for application of the present invention thereto. Cable converters typically include a microprocessor section illustrated in FIG. 3 by reference numeral 29 and a tuning section illustrated in FIG. 3 by reference numeral 31. For example, the Teknika 6401 cable converter includes such an arrangement, and a ribbon cable is normally supplied connecting the microprocessor board 29 to the tuning section 31. Typically, the microprocessor section controls a digital display and television receiver commands are received from a front panel on the cable converter, or a remote control as well know in the art. The microprocessor section sends commands to the tuning section via the ribbon cable normally connecting the two. In accordance with the present invention, the ribbon cable from the microprocessor board or section is interrupted and is connected to the data collection unit 21. The commands and the like from the microprocessor section 29 are interpreted by the data collection unit 21, which then in turn controls selection of a channel by the tuning section or board 31. As discussed more fully hereafter, the data collection unit 21 will normally cause the tuning section 31 to select and display whatever channel was indicated in the command information from the microprocessor section 29. However, when the present invention is in a substitute programming function, the data collection unit 21 will or can substitute programming, i.e. select a channel for display other than the channel indicated by the commands from the microprocessor board 29, for display at the television receiver. Also, the interconnection between the data collection unit 21 and the cable converter enables the data collection unit 21 to store information as to the channel being viewed and at what times, etc.

Figure 4:
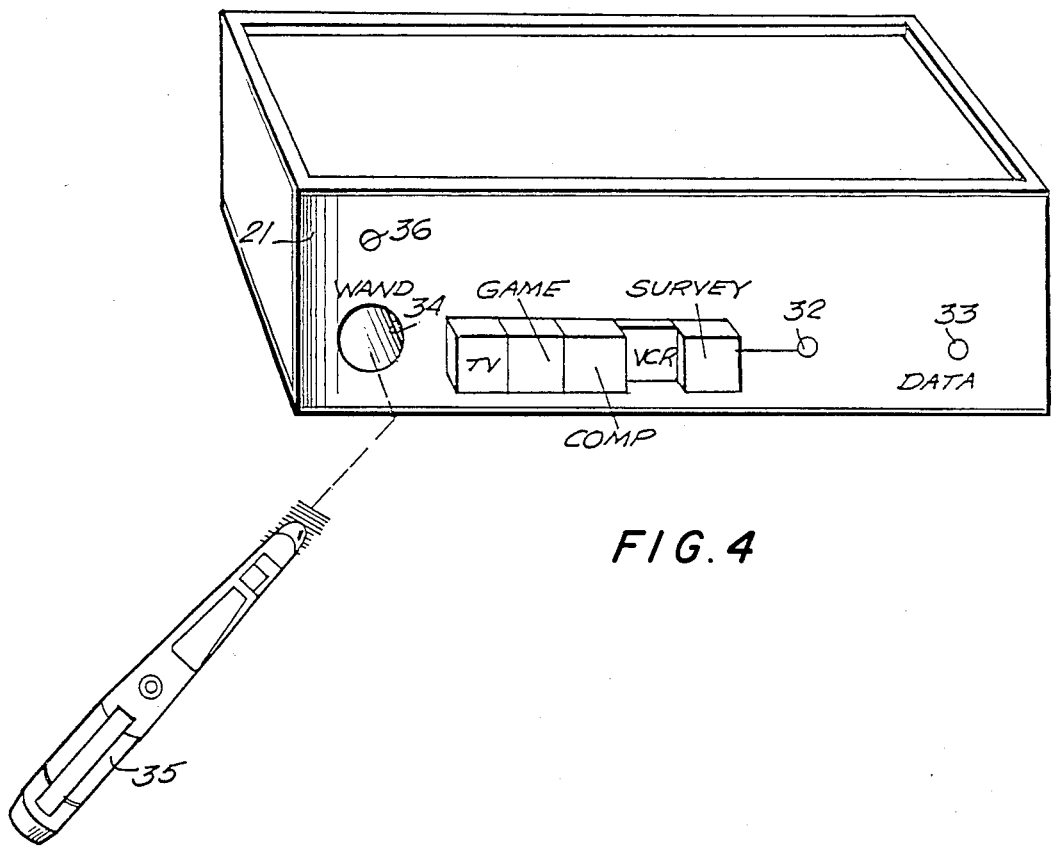
FIG. 4 is illustrates the mode switches and data wand of a data collection unit in accordance with the present invention.

Turning now to FIG. 4, there is shown a representation of the physical appearance of the data collection unit 21 in accordance with the present invention. The unit is preferably dimensioned such that a cable converter, such as the Teknika 6401 converter will sit right on top of the data collection unit. As illustrated in FIG. 4, five TV mode selector switches are provided in the form of pushbutton switches. These correspond to TV, game, computer, VCR, and survey. As mentioned previously, in accordance with one aspect of the invention survey questionnaires and the like can be downloaded from the central location over the telephone lines to memory in the data collection unit. Selection of the survey pushbutton switch in the data collection unit will then cause the survey questionnaire to be displayed on the television screen at the viewer's or panelist's convenience, for recording of answers to the questionnaire by the panelists. The manner in which these responses to the questionnaires are registered and stored is discussed hereinafter. However, as illustrated in FIG. 4, a light emitting diode 32 is provided on the front panel of the data collection unit in association with the survey pushbutton. When survey questionnaires are contained in the memory of the data collection unit and have not been responded to by the panelists, the light emitting diode 32 is lit in a manner discussed hereafter, so as to inform the panelists that there is an unanswered questionnaire. An additional data light emitting diode 33 is provided on the front panel of the data collection unit and provides further communication with a panelist, as discussed in detail hereafter.

Also shown in FIG. 4 is a receptacle 34 provided in the front panel of the data collection unit. The receptacle 34 is adapted to receive a data wand 35, and an additional light emitting diode 36 is provided on the front panel of the data collection unit for displaying indications relative to the data wand. The data wand 35 is an optical scanning device which contains its own internal memory. The data wand 35 can be used for scanning bar codes, such as the UPC codes found on products, and storing information relative to those bar codes. The data stored within the data wand 35 can be periodically transmitted to memory within the data collection unit, by inserting the data wand 35 into the receptacle 34.

A suitable example of an optical scanning device 35 for recording bar codes is that manufactured by MSI Corporation and sold under the trademark "DATA WAND." The MSI data wand is available with an RS-232C-type standard interface, which is incorporated into the data collection unit 21 in accordance with the present invention. This interface allows connection to the computer and memory provided in the data collection unit, as discussed more fully hereafter.

Figure 5:
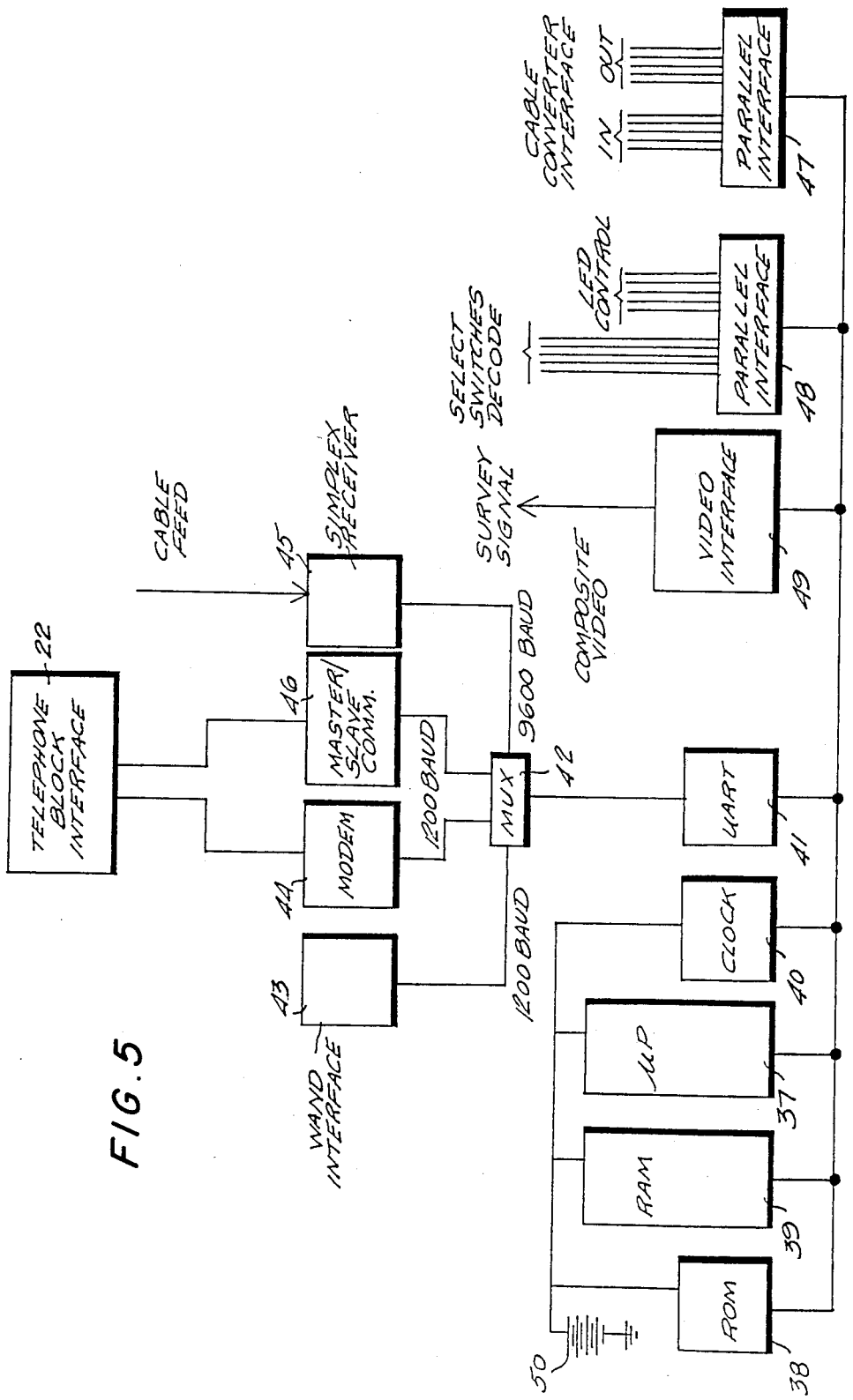
FIG. 5 is a detailed block diagram of a data collection unit in accordance with the present invention.

Referring now to FIG. 5, there is shown a functional block diagram of a data collection unit in accordance with the present invention. The heart of the data collection unit is a microprocessor 37 suitable programming for the microprocessor is contained in a ROM 38; details of the programming are discussed hereafter. A RAM 39 is also provided for storing event information such as channel selection, TV mode selection, data read by the optical scanner 35 and the like. A clock 40 is also provided to run the microprocessor 37, with the clock 40 also functioning to maintain a time of day indication for recording times in connection with events in the RAM 39. The RAM 39 typically is provided with 32k bytes storage. Also typically, 8k bytes of ROM.

The data collection unit contains a serial line driver 41, which is appropriately selected to be one of those available which has a programmable baud rate. This serial line driver 41 is connected via a multiplexer 42 to a variety of interfaces. First, a wand interface 43 is provided for accepting data from the optical scanner 35. As discussed previously, the wand interface provided with the MSI data wand has a standard RS-232 output at a 1200 baud rate. Another input to the multiplexer 42 is a modem 44 contained within the data collection unit. The modem 44 is a Bell 202 compatible, half duplex modem with an auto answer capability this modem 44 is coupled to the telephone block interface 22, which is described in more detail hereafter. The data transfer rate via the modem 44 is also 1200 baud.

The data collection unit also contains a receive only interface, shown as simplex receiver 45 in FIG. 5 which receives an input from the cable system. This simplex channel uses an FM carrier on the cable and originates as a broadcast from the CATV head end. As more fully discussed hereafter in connection with a discussion of the substitute programming aspect of this invention, certain control information is transmitted to the remote data collection units via this cable simplex channel. The transmission speed of this channel in accordance with one embodiment is 9600 baud.

A master/slave communication block 46 is shown in FIG. 5 as coupled to the telephone block interface 22. This master/slave communication block is only applicable where a plurality of television sets are provided in one panelist's home. The specific functioning of the master/slave relationship is described hereafter in connection with FIG. 5.

A parallel interface 47 is provided for providing the interface between the data collection unit and the cable converter. Thus the inputs and outputs of this parallel interface are from the microprocessor in the cable converter and to the tuning section of the cable converter (see FIG. 3).

A parallel interface 48 is also provided for decoding the mode or function select switches provided on the front panel of the data collection unit (see FIG. 4) and for controlling the three light emitting diodes 32, 33 and 36 on the front panel of the data collection unit.

A video interface 49 is provided for providing video output information to the television receiver through the cable converter to display survey questionnaires and the like on the television receiver when the survey mode is selected. As mentioned previously, in accordance with one aspect of this invention survey questionnaires can be downloaded over the telephone lines from the central location to the remote units while they are in telephone communication. The survey questionnaires are stored in RAM 39 and light emitting diode 32 is lit on the front panel of the data collection unit to inform the panelists that there is an unanswered questionnaire. When the panelist selects the survey function, the video interface 49 produces a composite video signal for display on the television receiver to display the questions in the questionnaire.

A battery 50 is also shown in the functional block diagram of FIG. 5. Although normal power connection for powering the data collection units is via the normal household power supply, a battery backup can be provided to ensure that the data collection unit remains powered up during any temporary power outages at the panelist's home, so as not to lose current time of day information in the clock 40 or any of the data stored in the RAM 39.

All of the circuitry functionally illustrated in the block diagram of FIG. 5, with the exception of the master slave communications 46 and the telephone block interface 22, can be any appropriate integrated circuits or the like which are available on the market for the functions indicated.

An important aspect of the data collection unit in accordance with the present invention is its interface to the cable converter. Specifically, it is the data collection unit itself which controls the tuning of the cable converter. The viewer or panelist appears to control the cable converter normally, but the signals are actually intercepted by the data collection unit and it is the data collection unit that commands the tuning of the converter, as has been described above in connection with FIGS. 2 and 3. During most television viewing activity, the data collection unit will command the tuner to select the same channel that the viewer has selected. However, when in functions which are described as "Channel-Lock" and during "Dynamic Allocation", the data collection unit will select channels other than the one being displayed.

Channel Lock is a data collection unit function in which the cable converter remains locked on one channel regardless of the activity occurring with the converter control and the channel number being digitally displayed on the cable converter. Channel Lock is entered by selecting an unoccupied converter channel, such as channel 35. When the data collection unit decodes channel 35, it will freeze the converter on the channel previously selected and illuminate light emitting diode 33 on the front panel of the data collection unit (see FIG. 4). The viewer or panelist can now use the converter control to display any channel number on the converter without changing the channel being viewed. The data collection unit will collect events, as in the normal viewing mode, including storing the subsequent channels selected during the Channel Lock condition as events. Each time the data collection unit collects events the light emitting diode 33 will be blinked off, corresponding to an indication that an event has been captured by the data collection unit. This Channel Lock feature is useful from a number of standpoints. For example, when in a Channel Lock condition the viewer could select various channels for entry as events with the various channel numbers selected corresponding to the viewer's qualitative reaction to programming. As another example, a particular channel number could be entered while in the Channel Lock condition which corresponds to the identification of particular individuals who are viewing the program within the household. Likewise, selection of channel numbers while in a Channel Lock condition is useful in connection with responding to survey questionnaires and the like, which is described more fully later. A key feature of the present invention is that entry of such qualitative viewer reaction data and the like is achieved while being able to use the normal channel selector associated with the cable converter, rather than any kind of separate key pad or other data entry device. The "Channel-Lock" condition is exited by selecting an unoccupied converter channel, such as 36, at which time the light emitting diode 33 is extinguished and normal tuning of the converter is resumed.

As has been previously described, the select switches or mode switches provided on the front panel of the data collection unit (see FIG. 4) allows the viewer to select one of a number of alternate signal sources. For example, these possible alternative signal sources are TV (either cable or air), VCR, game, computer and survey. The switches as shown in FIG. 2 select one of the signal sources and route it to the input of the cable converter. The data collection unit monitors the switch selection and controls the converter tuning accordingly. If TV viewing is selected, then normal converter operation is enabled. If one of the other four sources are selected, the data collection unit will record an event and tune the converter to the appropriate channel to tune the signals which are selected. For example, the game and VCR output may be on channel 3, while the computer output is on channel 10. These are specific parameters that can be adjusted with respect to any particular installation.

Dynamic allocation is a term used to describe the concept of blind or invisible channel substitution. As described earlier, U.S. Pat. No. 3,639,686 to Walker et al relates to such a dynamic allocation or substitute programming kind of system. In accordance with one embodiment of the present invention, a substitute programming arrangement in accordance with the principles of the Walker et al patent is incorporated. Basically, the dynamic allocation process is one in which one or more channels in selected households are substituted with another test channel by the data collection unit.

The materials substituted usually are commercials, for purposes of market research with respect to the efficacy of commercials. In practice, a set of substitute commercial cut-ins are scheduled each day. For example, each cut-in can be assigned a two digit number. For each cut-in, a channel remap table is loaded into the data collection unit. The remap tables are simple and consist, for example, of one or more channel numbers and the channel they are to be remapped to. At any given time, the memory in the data collection unit can hold a number of such remap tables. In accordance with one embodiment of the invention, the remap tables are downloaded over the cable channel and received by the simplex receiver 45 (FIG. 5).

Each data collection unit has an identification number. There can either be unique identification numbers for each data collection unit corresponding to each panelist location, or panelists can be grouped in accordance with demographic considerations and assigned a common identification number. Identification numbers for each data control unit can be downloaded to the unit from the central location during telephone communications between same.

Since the messages transmitted on the simplex channel over the cable are received by all data collection units, they must be addressed to particular data collection units or groups of data collection units and be appropriately formatted with message delimiters and the data collection unit identification numbers. As discussed above, the dynamic allocation remap tables are downloaded over the cable channel and received by the simplex receiver 45 at each of the data collection units.

These remap tables are stored in RAM 39. A remap table is enabled, during the cut-in, by continually transmitting the cut-in number down the cable to the simplex communication channel. Whenever a data collection unit receives a cut-in number, the particular remap table is enabled for some predetermined time, i.e. 0.5 seconds when the remap table is enabled for a particular data collection unit, the data collection unit automatically provides substitute programming as indicated by the remap table to the television receiver of the panelist. This alternate programming is transmitted from the cable head in down channels normally not used for entertainment.

This dynamic allocation feature facilitates market research. By displaying alternate forms of a commercial to different groups of panelists, and correlating that display both with the demographic data concerning the panelists and the product purchases by the panelists, the efficacy of the commercials can be evaluated.

In accordance with one embodiment of the present invention correlation of panelist viewing activity as to commercials and the like with product purchases made by the panelist has been greatly facilitated. The earliest market research techniques relied upon a panelist filling out a purchase diary or the like with this information then being manually collected by the market research organization for correlation with viewing activity of that particular panelist. Systems have been proposed in which viewing activity of a panelist is correlated with product purchase information with respect to that panelist by monitoring at stores within a limited geographic area surrounding the panelists the product purchase information with respect to that panelist. Specifically, each panelist has an identification card presented at a grocery store at the like which uses check out counters having the facility for optically reading universal product codes on products. When the panelist makes purchases, the identification of that panelist is scanned into the computer at the store, along with the product purchase information with respect to that panelist. This information is either coupled from the store's computers to the market research organization, or collected at a later time from the stores by the market research organization.

For certain market research activities, it might be desirable to have a national group of panelists, spread across the geographic extent of the United States or whatever other country that is the subject of the market research. For such an arrangement, it would not really be feasible for the market research organization to have arrangements with and be tied into the computers of stores spread all across the country. Therefore, in accordance with one aspect of the present invention, collection of information regarding product purchases by a panelist has been greatly facilitated.

As described in connection with FIG. 4, the data collection unit in accordance with this one aspect is equipped with an optical scanner, one suitable example of which is a product known as the MSI data wand. This is a hand held device that contains an internal memory and can be used for scanning bar codes, such as universal product codes, contained on products purchased by a panelist. Thus, in accordance with this one aspect of the present invention, product purchase information with respect to a particular panelist is easily collected by the panelist simply scanning the data wand over the universal product codes on the products purchased by the panelist. The MSI data wand has an internal memory which can store approximately 4,000 digits. This memory is of a sufficient extent to store the product code and a price for about 300 items, which should be adequate for recording the daily purchases for a household. After scanning products with the data wand, the data wand can be inserted into the receptacle in the front panel of the data collection unit and the memory contents of the data wand transferred to memory within the data collection unit. As explained previously, the MSI data wand can be obtained with an RS-232 interface for this purpose, which interface is incorporated within the data collection unit. The procedure for transferring the data wand information into the data collection unit is as follows. The panelist turns on the cable converter, enters the channel lock condition, and then selects an unused channel, such as 34, which is programmed to instruct the data collection unit to monitor the interface with the data wand. The panelist then scans the data wand over a special code that is provided with the data wand which instructs the data wand to transmit data. The data wand is then inserted into the holder or receptacle within the data collection unit. After the data has been received and verified by the data collection unit, the light emitting diode 36 (see FIG. 4) provided on the front panel of the data collection unit will blink off and on for five seconds, so as to inform the panelist that the operation has been successfully completed. Then, the panelist extracts the wand from the data collection unit, clears the wand memory in accordance with features provided in the data wand, and reinserts the data wand into the data collection unit for storage in the receptacle.

Subsequently, when telephone communication is established between the central location and the individual data collection units at the various panelists homes, the stored product purchase information with respect to the various panelists is transferred from memory of the data collection unit to the central location. This greatly facilitates collection of such product purchase data with respect to individual panelists, and correspondingly facilitates correlation thereof with viewing activity of those panelists. Using such an arrangement, a nationwide group of panelists scattered over a wide geographic area is practical.

As has been previously mentioned, when a particular data collection unit is in contact with the central location, a survey questionnaire or the like may be downloaded over the telephone lines into memory of the data collection unit. Whenever the data collection unit contains an unanswered questionnaire, the data collection unit will illuminate the survey light emitting diode 32 on the front panel of the data collection unit so as to inform a panelist that the data collection unit contains a survey which has not been answered. Anytime that this light emitting diode 32 is illuminated, the panelist may elect to turn on the television and depress the survey select mode select switch on the front panel of the data collection unit. The data collection unit will detect depression of the survey select switch, illuminate the data light emitting diode 33, tune the cable converter to the appropriate channel, and output the first question to the television through the video interface 49 (FIG. 5). The converter is automatically placed in a channel lock condition at this time by the data collection unit. The viewer can thus use the converter control or channel selector to enter channel numbers to answer whatever questions are presented in the questionnaire. For example, a questionnaire might ask a question and give five possible responses, with a number beside each of the possible responses. The panelist enters a channel number corresponding to the number adjacent the answer the panelist is giving to the question. When all the questions have been answered by the panelist, the data light emitting diode 33 on the front panel of the data collection unit will be extinguished. When the panelist then depresses another mode select switch, the survey light emitting diode 32 will also be extinguished.

Figure 6:
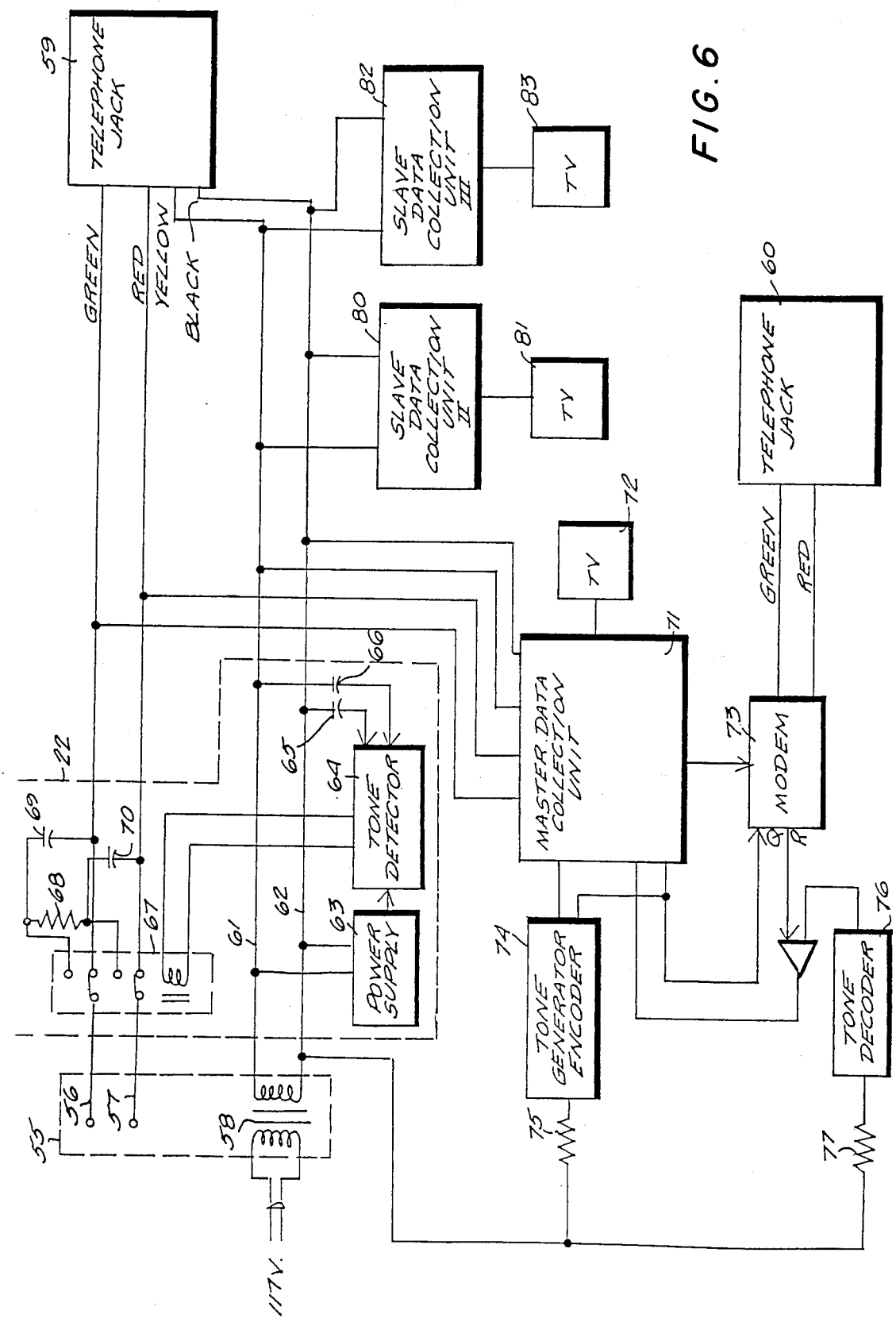
FIG. 6 is a block diagram of the telephone block interface and master/slave coupling in accordance with one embodiment of the invention.

As has been described previously, the transfer of data from the remote data collection units to the central location is achieved by telephone communcations over the switch telephone network between the central location in each of the various remote units. Also, situations arise in which there is more than one television receiver within a single panelist's home, and some means is necessary to collect viewer data and the like with respect to each of the television sets, and store and communicate that data to the central location at an appropriate time. Referring now to FIG. 6, there is shown one embodiment of the invention which illustrates the manner of effecting telephone communications from a remote location or panelist's home to the central location, and also the situation in which there is more than one television receiver in a single panelist's home which have to be monitored.

Referring now to FIG. 6, there is illustrated a telephone block generally indicated by reference numeral 55. At each building or house there is a point at which telephone service enters the building which is referred to as the telephone "block." This block includes terminals for the telephone lines 56 and 57 and may also contain several other devices to protect telephone line service, such as lightening arresters and voltage limiters (not shown). Typically, the telephone block also contains a low voltage transformer indicated by reference numeral 58 which is used to supply lighting power to the telephone. In accordance with standard color coding, the telephone lines 56 and 57 are respectively green and red and extend to a number of telephone jacks, two of which 59 and 60 are illustrated in FIG. 6. Two signal lines 61 and 62 from the low voltage transformer 58 also extend to the various telephone jacks and are color coded yellow and black, respectively.

In accordance with the present invention, a telephone block interface 22 is provided at the point of the telephone block within a building. This telephone block 22 is interfaced to the telephone lines 56 and 57 as well as the low voltage power lines 61 and 62. Low voltage from the transformer 68 is used to supply power via a power supply 63 to a tone detector 64. This tone detector 64 is a low energy detector used to detect the presence of a control tone, for example a 150 KHz signal which can be imposed on the low voltage lines 61 and 62, in a manner discussed hereafter. Thus the tone detector 64 is connected to the power lines 61 and 62 via coupling capacitors 65 and 66. The tone detector 64 is coupled to and controls a relay 67 which is actuated between the position shown in FIG. 6, wherein the telephone lines 56 and 57 are not interrupted, to a position where the telephone lines 56 and 57 are coupled through a load resistor 68 and capacitors 69 and 70.

In FIG. 6 there is shown a master data collection unit 71 which is typically connected to a television receiver 72. Provided as part of the master data collection unit 71 is a modem 73, which as discussed previously can be a standard kind of modem, such as an auto-answer bell 202 modem. This is a 1200 baud, half-duplex device.

The modem 73 in accordance with this invention is also connected to a telephone jack, for connection to the telephone lines 56 and 57.

A tone generator-encoder 74 is coupled to the master data collection unit 71 and through a resistor 75 to one of the power lines 61 and 62. Similarly, a tone decoder 76 is also coupled to a load resistor 77 to one of the signal lines 61 and 62 and through an amplifier 78 to the master data collection unit 71.

In operation, the master data collection unit 71 will enable the modem 73 for a limited period of time or "window" each day. Typically, a call-in window of a two hour duration will be opened once per day at a time when the telephone system is normally not in use, i.e. 4-6 a.m. in the morning. During this time window, the master data collection unit 71 will answer each incoming telephone call, and quickly determine if the call originates from the central location. The manner in which this is done is as follows.

During the call in window, a ring signal occurring at the telephone block 55 is a signal of about 45 volts at 25 Hz. This is impressed across the telephone signal lines 56 and 57, and would normally cause telephone sets connected to the telephone service to ring. However, the master data collection unit 71 samples the first half cycle of any incoming signal during the call in window for voltage and pulse duration. If the microprocessor within the master data collection unit 71 determines the signal is a ring signal, the tone generator encoder 74 is caused by the data collection unit 71 to impress a 150 KHz tone on the low voltage lines 61 and 62. In response to this tone, the tone detector 64 actuates the relay 67. With the relay 67 actuated, the remainder of the ring signal is absorbed by the load resistor 68. Since load resistor 68 is sufficiently low in value to indicate to the telephone system that a connect has been made, there will be no further rings.

The modem 73 is a standard telephone modem well known to those skilled in the art. This modem is caused by the microprocessor within the master data collection unit 71 to send a two to four second tone, such as a 380 Hz side tone, back to the calling source via the telephone lines 56 and 57 and the coupling capacitors 69 and 70. If the calling source is in fact the computer at the central location, the computer at the central location will respond with an answering tone, and two way computer-to-computer conversation will be established. If, on the other hand, there is no answering tone from the source of the telephone call, indicative that the calling party is not the central location computer, the data collection unit 71 removes the 150 KHz carrier tone on the low voltage leads 61 and 62, causing a disconnect.

If the call coming in during the call in window is in fact not the central computer, but a normal telephone caller, the telephone caller would hear the side tone and the disconnect, and a dial tone would be returned. If such a call comes in and a disconnect occurs, the data collection unit 71 is programmed to disable the tone generator encoder 74 for a predetermined period of time, such as twenty minutes. Thus, any calls coming in during this next predetermined time period of twenty minutes or the like would cause normal telephone ringing. The caller, having been disconnected, would then be able to dial his call again, this time with success. Inasmuch as the sequence of events occurs outside of normal telephone usage hours, it is not believed that such a sequence of events represent any serious impairment to normal telephone usage.

If it is determined that the calling source is the central computer, so that computer-to-computer communication is established, upon establishment of that communication the central computer, under appropriate programming, calls on the master data collection unit for the information stored during the day. Upon receiving this information, the central location may cause a new program to be loaded into the data collection unit 71 memory, such as a questionnaire or the like as discussed previously. If the master data collection unit 71 is the only data collection unit to be communicated with by the central location, the central computer upon completion of receiving the stored information and loading any new program information into the master data collection unit 71 simply disconnects, and all circuits return to normal.

Referring to FIG. 6, one embodiment of the invention is also illustrated in which there are multiple television receivers within a single panelist's home which must be monitored. As illustrated in FIG. 6, two additional television receivers 81 and 83 might exist in a panelist's home, and slave data collection units 80 and 82 are associated therewith as illustrated in FIG. 6. These slave data collection units 80 and 82 are coupled to the low voltage lines 61 and 62. Thus, the slave data collection units can be connected to any of the various telephone jacks within the panelist's house, and coupling to the master data collection unit and the other circuitry is by means of the existing telephone wiring within the household. In accordance with one embodiment of the invention, all signals received from the central location via the modem 73 are sent first to the master data collection unit 71, then echoed via the tone generator 74 to the signal lines 61 and 62 so that the slave data collection units 80 and 82 receive the incoming data. Tone generator 74 generates a multiplicity of tones to keep the relay 67 closed, plus an additional variable frequency tone representing the data being transmitted. These tones range, for example, from a 150 KHz to 350 KHz and are impressed as carrier currents on the signal lines 61 and 62. Each of the slave data collection units contains a microprocessor and would require a tone generator and tone decoder similar to the tone generator 74 and tone decoder 76, but would not require any separate modem. Each of the slave data collection units receives the identical data to the master data collection unit 71. By addressing the data stream, the slave data collection units can be caused to act independently. When a slave data collection unit is called upon to respond, so as to transmit data stored in the slave data collection units the carrier current signal impressed on the low voltage lines 61 and 62 reverses direction, the tone decoder 76 receives the signal from the slave data collection unit, decodes it into standard data which is then echoed by the master data collection unit 71 through the modem 73 to the central location.

In the manner described above, each of the data collection units, which are coupled together via the existing telephone wiring in a panelist's home, receives all of the incoming information from the central location, and can be caused to respond independently to transmit data stored in each of the data collection units back to the telephone lines to the central location. Of course, other variations are possible. For example, at a preset programmed time programmed into the microprocessor of the master data collection unit 71, the master data collection unit can poll each of the slave data collection units by carrier current over the low voltage telephone wiring 61 and 62 to collect the available data at each of the slave data collection units, addressing each of these slave data collection units seriatum by code as necessary. Thus, all of the data from all of the various data collection units within a panelist's home would be stored in the master data collection unit. Then, upon contact of the master data collection unit 71 with the central location, the central location would obtain the data by simply contacting the master data collection unit. Similarly, the central location would load the master data collection unit with any new programs, such as questionnaires and the like, which is to be stored in memory at the various data collection units. Then, when the central location disconnected the telephone connection with the master data collection unit 71, the master data collection unit can then relay the new programs to the slave data collection units, addressing each by code as necessary.

Thus, in accordance with the above described arrangement and as illustrated in FIG. 6, a plurality of data collection units can be provided within a single panelist's home associated with respective different plurality of television receivers, for monitoring each of the television receivers in the same fashion as a single data collection unit is provided to monitor one single television receiver. Although the various slave data collection units have been shown as coupled to the master data collection unit through the existing telephone wiring in a panelist's home, it should be clear that existing power wiring within a panelist's home can also be used for the same function. That is, carrier signals can be impressed upon the power wiring within a panelist's home for transferring data to and from various slave data collection units to the master data collection unit. Of course, as a further alternative, dedicated wiring could be installed in a panelist's home for connecting the various slave data collection units to the master data collection unit.

Figure 7:
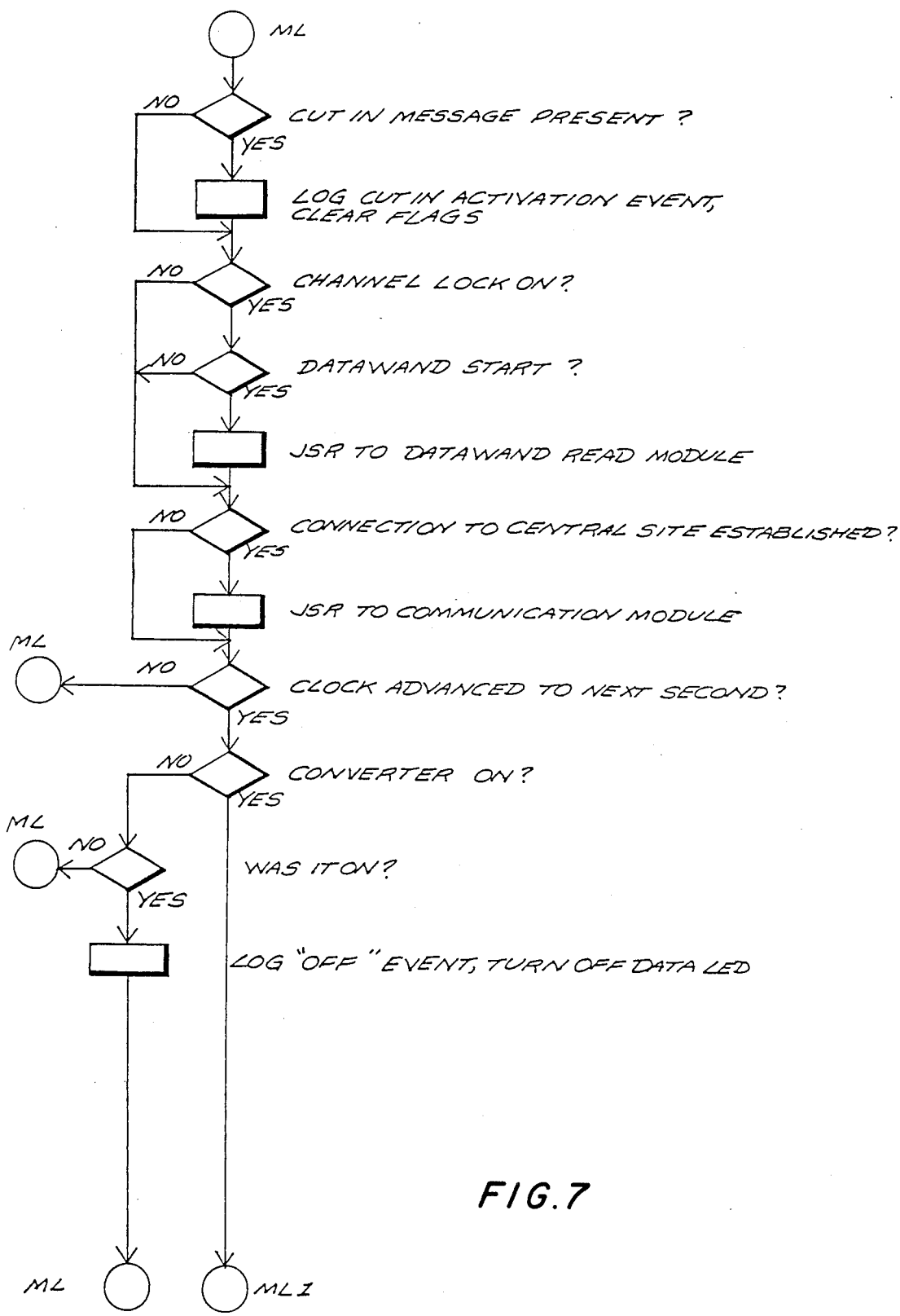
FIG. 7 is a logic flow diagram of the main loop lope of a data collection unit in accordance with the present invention.

Turning now to FIG. 7, there is shown a logic flow diagram for the software controlling the main loop (ML) of the microprocessor within the data control unit. The first decision block is as to whether or not there is a cut-in message present. It will be recalled as discussed previously that remap tables for achieving dynamic allocation or substitute programming are stored in the memory of the data collection units and are enabled by transmission of a cut-in number down the cable. If there is a cut-in message present, the cut-in activation event is logged, and all flags in the system are cleared. If there is no cut-in message present, then the logic flow is to the next decision block as to whether or not the channel lock is on. If the channel lock is on, the next decision block is to whether or not a data wand start condition exists. If a data wand start condition exists, the logic flow is jump subroutine (JSR) to data wand read module. The no conditions to the decision block for the channel lock on and data wand start lead to a decision block as to whether or not connection to central site is established. If it is, the next block is a jump subroutine (JSR) to communication module. If connection to central cite is not established, then the next decision block is to whether or not the clock is advanced to the next second. If it is not advanced to the next second, the logic flow is back to the upper portion of the main loop (ML). If the clock is advanced to the next second, the next decision block is to whether or not the converter is on. If the converter is on, the logic flow progresses to a main loop 1 (ML1). If the converter is not on, the next decision block is to whether or not the converter was on. If it was not, the logic flow is back through the main loop ML. If the converter was on, then the next decision block is to log an off event, and turn off the data light emitting diode (light emitting diode 33 in FIG. 4). The timing of the lower portion of the logic flow diagram indicated in FIG. 7 i.e. as to whether the converter is on, is executed once per second in accordance with the programming. Other aspects of subroutines, such as the converter control subroutine discussed hereafter, are interrupt driven and operate asynchronously to the bottom portion of the ML loop in FIG. 7. Components of the data collection unit system which are interrupt driven pass flags and values to this main loop ML for logging and dispatching.

Figure 8:
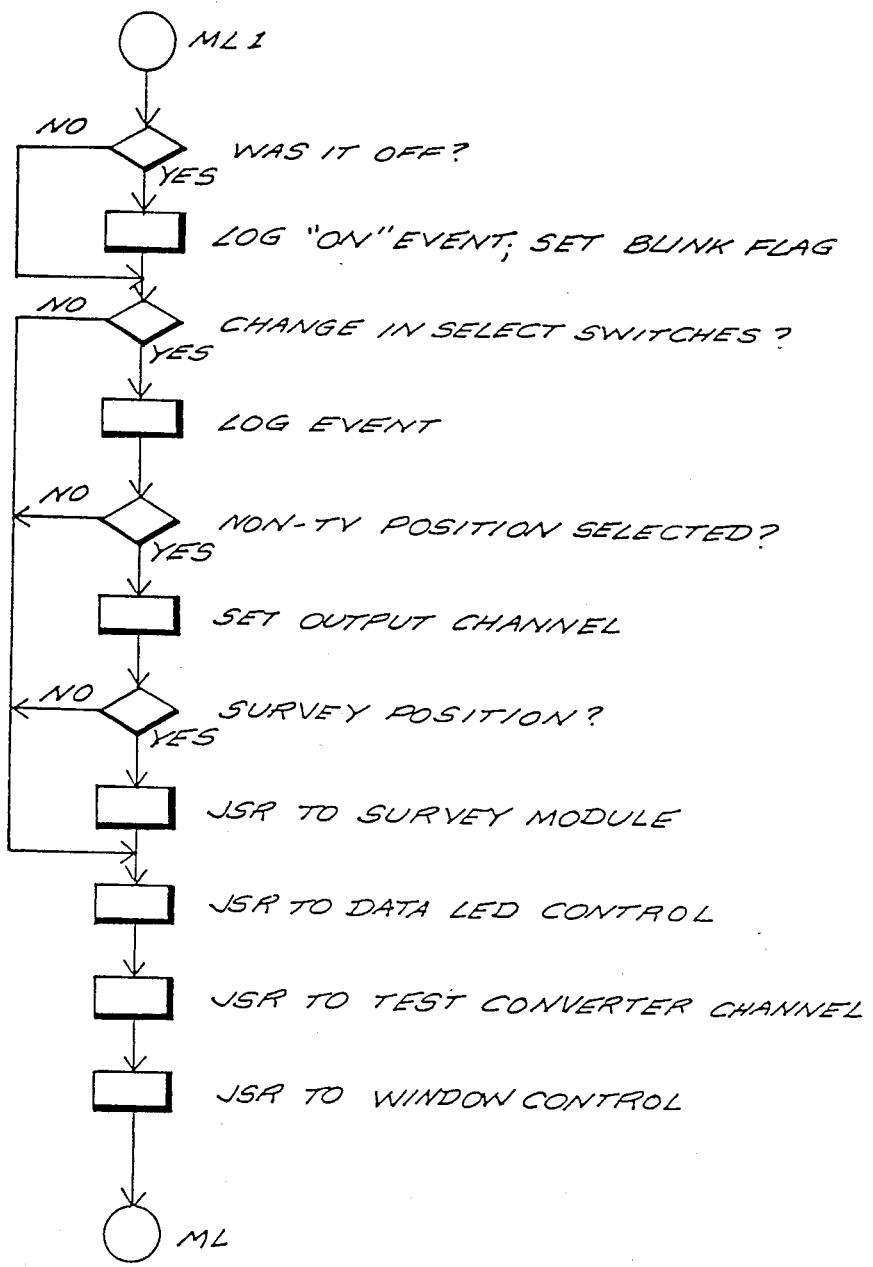
FIG. 8 is another logic flow diagram for converter control in accordance with one embodiment of the present invention.

Turning now to FIG. 8, there is shown the logic flow diagram for the main loop 1 (ML1). This loop is entered when the logic flow in FIG. 7 has a yes decision as to whether or not the converter is on. The first decision block in the loop ML1 is to whether or not the converter was off. If the converter was off, an on event is logged, and the blink flag is set (which as discussed later causes the data light emitting diode to blink). If there is a no decision to the logic block as to whether the converter was off, the logic flow is to the decision block as to whether or not there is a change in the select switches. If there is, an event is logged and the logic flow passes to a decision block as to whether or not a non-TV position is selected. If the decision is yes, the appropriate output channel is set on the converter for whatever position is selected, i.e. computer, VCR, etc. The next decision block is to whether or not the select switches are in the survey position. If so, there is a jump subroutine (JSR) to the survey module. Next, there is a jump subroutine to data LED control, and following that a jump subroutine to test converter channel. Following that, there is a jump subroutine to window control. This window control refers to whether or not the time window permitting call in from the central location to the remote unit is open or closed. As previously discussed, advantageously a two hour window may be employed at a time when it is not expected that the telephone in the panelist's home will be in use, i.e. early in the morning hours.

Figure 9:
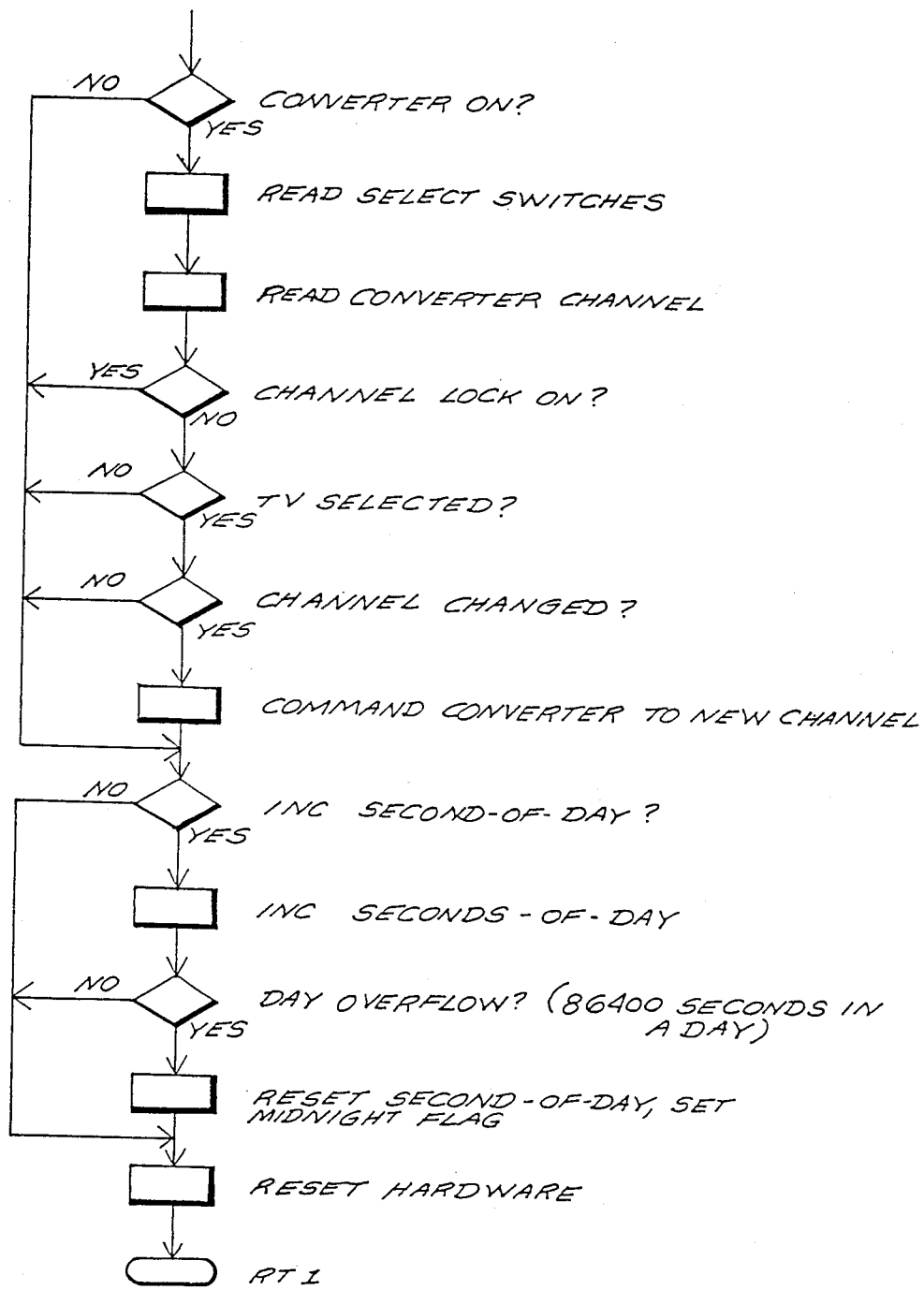
FIG. 9 is a logic flow diagram of another subroutine in accordance with the present invention.

Referring now to FIG. 9, there is shown the main subroutine for clock housekeeping and converter control. The subroutine illustrated in logic flow diagram form in FIG. 9 is interrupt driven with the rate thereof set as a system parameter. In accordance with one embodiment of the invention, the interrupt rate is nominally set for 0.1 second. The flags and values set in the subroutine illustrated in FIG. 9 are monitored by the main loop illustrated in FIG. 7. Referring now specifically to the subroutine illustrated in FIG. 9, the first decision block is to whether or not the converter is on. If the converter is on, the select switches are red and the converter channel is red. The next decision block is as to whether or not the channel lock is on. If the channel lock is not on, the next decision block is whether or not the TV is selected. If the TV is selected, the next decision block is whether or not the channel has been changed. If the channel has been changed, then the subroutine commands the converter to tune to the new channel.

The bottom portion of the logic flow diagram of FIG. 9 relates to clock housekeeping. The first decision block is whether or not there is an increment in the second of day. If there is, the subroutine executes an increment to the seconds of day value. The next decision block is as to whether or not there is a day overflow. If there is, the subroutine resets the second of day and sets a midnight flag, indicative that a day has passed. The block labeled RT1 is an exit from this subroutine. As indicated, the subroutine is interrupt driven at a rate system parameter, which in accordance with one embodiment is nominally set for 0.1 second.

Figure 10:
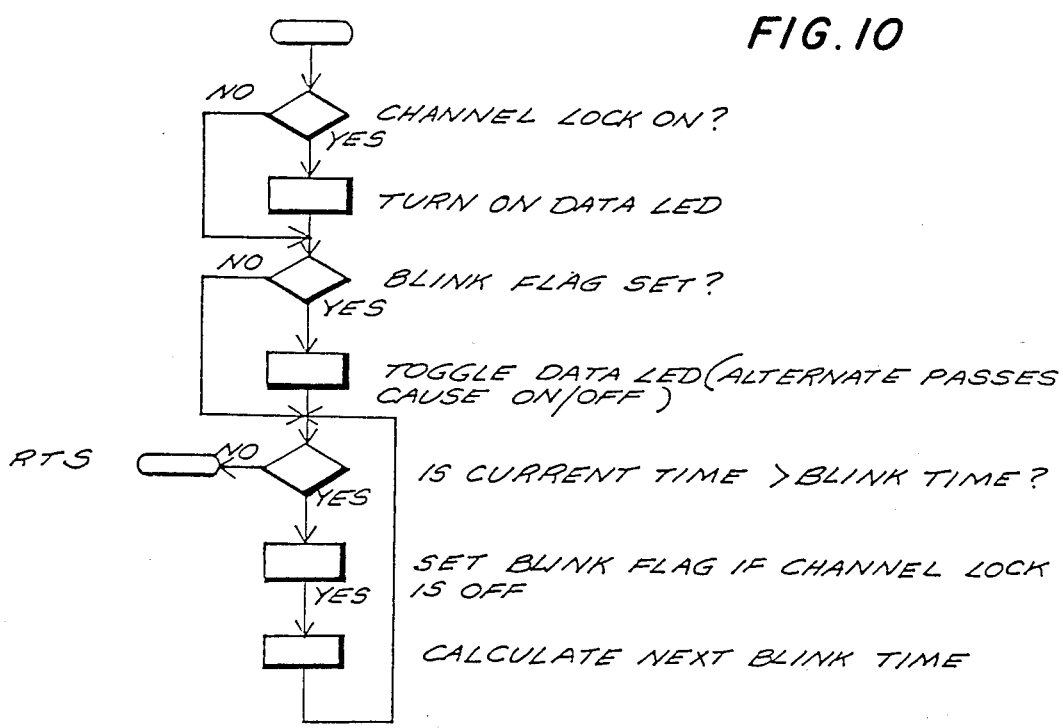
FIG. 10 is a logic flow diagram for the data LED control subroutine of one embodiment of the present invention.

Turning now to FIG. 10, there is illustrated a logic flow diagram for the data LED control module, referring to the data light emitting diode provided on the front panel of the data collection unit. This is the data LED control block illustrated in FIG. 8. In the subroutine of FIG. 10, the first decision block is as to whether or not the channel lock is on. If it is, the data LED is turned on. The next decision block is as to whether or not the blink flag is set. If it is, the data LED is toggled on and off. The next decision block is whether or not the current time is greater than the blink time. If it is not, there is an exit from the subroutine (RTS). If it is, the blink flag is set if the channel lock is off and the next blink time is calculated. The subroutine then loops back to reenter the decision block as to whether or not the current time is greater than the blink time.

Figure 11:
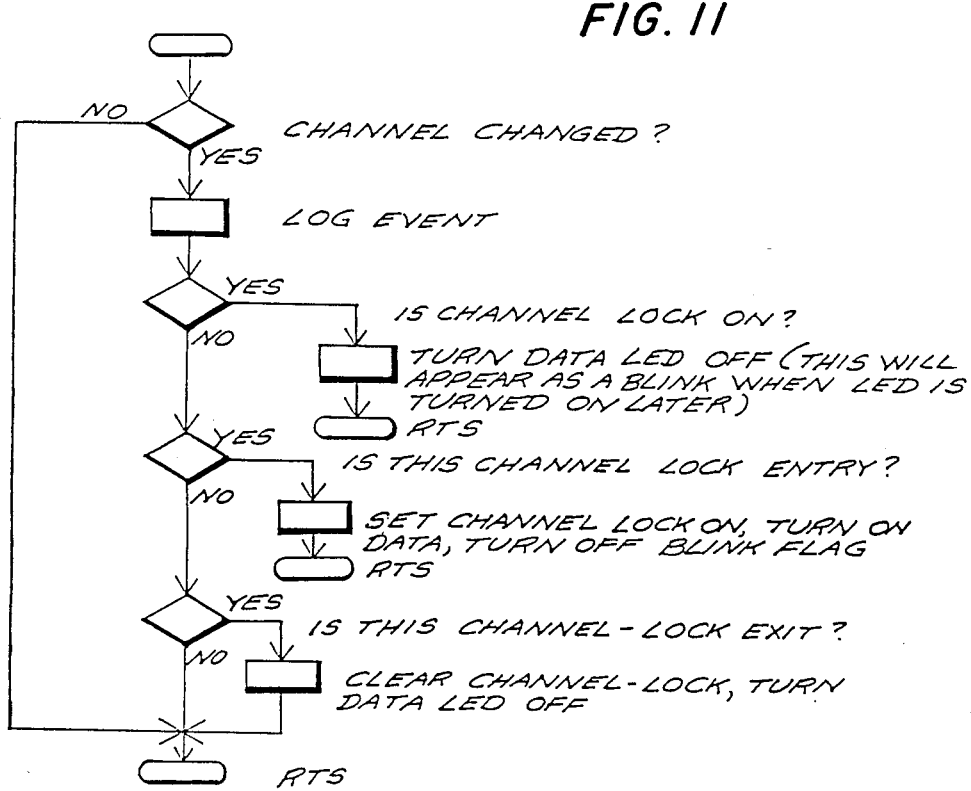
FIG. 11 is a logic flow diagram of a subroutine also relating to converter control.

Turning now to FIG. 11, there is illustrated in logic flow diagram form the subroutine relating to the test converter channel module referred to in FIG. 8. In FIG. 11, the first decision block is as to whether or not the channel has changed. If it has, an event is logged. Next decision block is as to whether or not the channel lock is on. If it is, the data LED is turned off (which will appear as a blink when the LED is turned on later) and there is an exit from the subroutine i.e. a return to start. If, on the other hand the channel lock is not on, the next decision block is as to whether or not this is a channel lock entry, i.e. has a channel been selected that corresponds to entering channel lock. If it does, the channel lock is set on, the data LED is turned on, and the blink flag is turned off and there is a return to start. If, on the other hand, this is not a channel lock entry, the next decision block is as to whether or not the channel entered is a channel lock exit. If it is, the channel lock is cleared and the data LED is turned off. If it is not a channel lock exit, there is a return to start for the subroutine.

Figure 12:
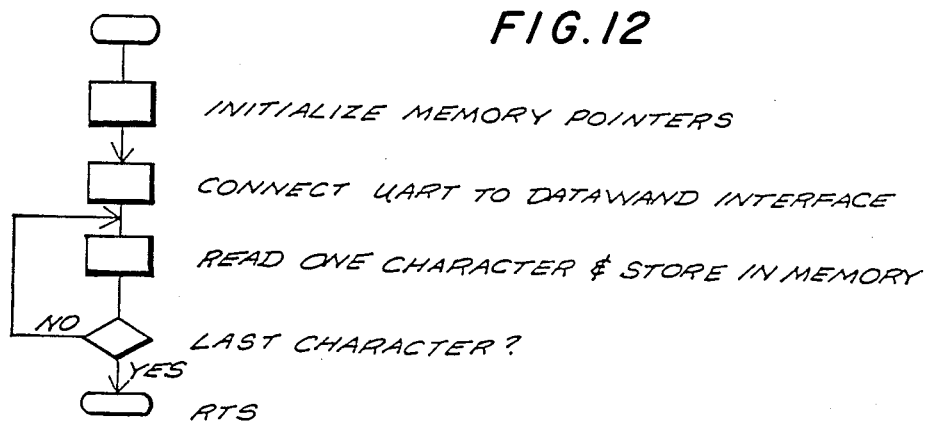
FIG. 12 is a logic flow diagram related to storing optically scanned data from a bar code reader in accordance with one embodiment of the present invention.

Turning now to FIG. 12, there is shown a logic flow diagram for the data wand read module. The first step in the logic flow is to initialize memory pointers, so that the data read in from the data wand is placed in the proper portion of the memory of the data collection unit. The next step in the logic flow is to connect the universal asynchronous receiver transmitter to the data wand interface. Characters are then read out one by one from the data wand interface and stored in memory.

Figure 13:
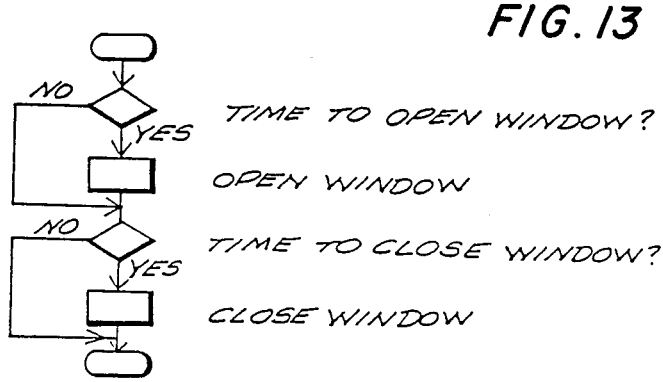
FIG. 13 is a logic flow diagram relating to control of a time window for telephone communications in accordance with one embodiment of the present invention.

FIG. 13 illustrates the logic flow for the window control module. As illustrated, the only decisions are whether or not it is time to open the window or close the window so as to permit establishing telephone communications between the data collection unit and the central location.

Figure 14:
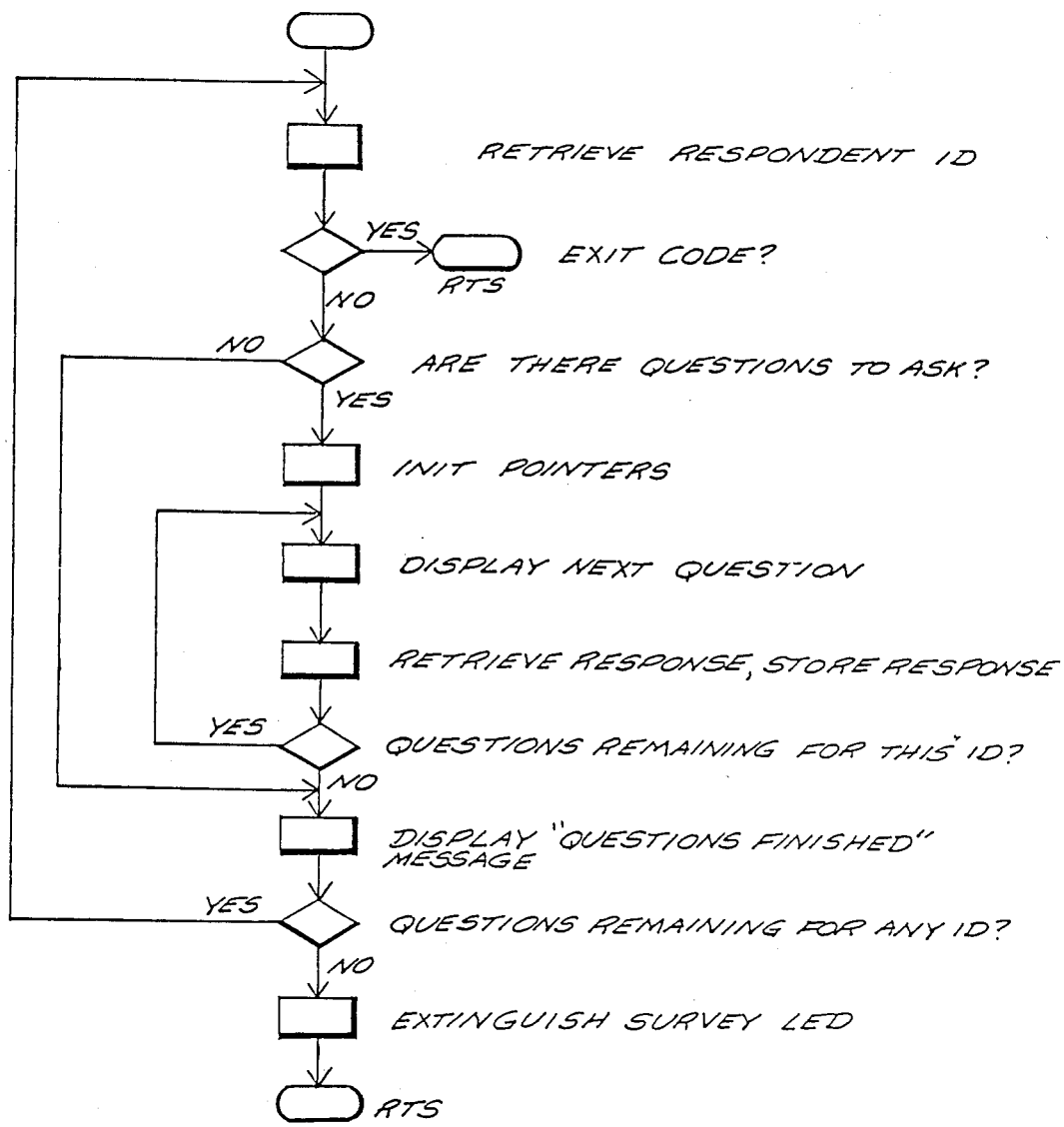
FIG. 14 is a logic flow diagram relating to the survey function of one embodiment of the present invention.

Referring now to FIG. 14, there is shown a logic flow diagram for the survey module the first step in the subroutine is to retrieve the respondent i.d. In connection with the survey function, it is useful to have different members of a panelist's household separately answer the questions in a survey. For this purpose, each of the members of the household are assigned an i.d. number. When the survey select switch is selected to enter the survey mode, the channel lock condition of the converter is automatically entered and the converter is tuned to the appropriate channel to display the survey questions. The first question presented is to ask the person answering the survey to enter his or her i.d. number, which is simply a preassigned channel number which the respondent enters. The next decision block is with respect to whether or not there is an exit code in the information coming from the survey data storage in memory. If there is, the subroutine is exited. The next decision block if there is no exit code is as to whether or not there are questions to ask. If there are, various pointers with respect to memory location and the like are initialized and the next question in the survey data is displayed. The respondent responds to the question by entering a channel number that corresponds to one of a plurality of possible answers to the question. This response is retrieved and stored in memory. The next decision block is to whether or not there are any questions remaining for this i.d., i.e. whether or not this particular member of the household has further questions which need to be answered. If there are, the next question is displayed, the response retrieved and stored, and so on. If there are no questions remaining for this particular respondent, a "questions finished" message is displayed. The next decision block is to whether or not there are questions remaining for any i.d., that is, whether or not there are further survey questions for any other members of the panelist's household. If there are not any further questions remaining for any i.d., the survey light emitting diode is extinguished. As previously discussed, this survey light emitting diode on the front face of the data collection unit is illuminated whenever there are any unanswered survey questions in memory.

Figure 15:
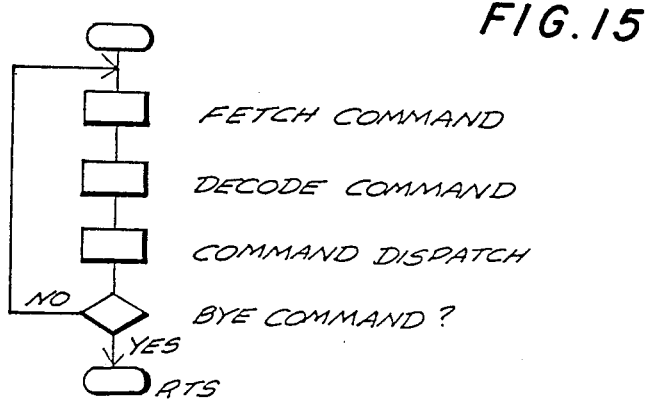
FIG. 15 is a logic flow diagram for a communication subroutine in accordance with one embodiment of the present invention.

Turning now to FIG. 15, there is illustrated a logic flow diagram with respect to the communication module. The first step in the subroutine is a fetch command, which is simply a receipt of a character stream. The character stream is decoded, and the command dispatch step involves referencing the place in the memory corresponding to the decoded command, and execution of the relevant further commands stored at that location in memory. The final decision block in this subroutine is as to whether or not there is a bye command. That is, at the end of the character stream an entry signaling that it is the end of the character stream is inserted, and this decision block decides whether or not the communication is ended.

We claim:

1. In a system for collecting data with respect to cooperating television viewers or panelists, including a central location and a plurality of remote units at a plurality of panelist locations, a remote unit for connection to a television broadcast receiver comprising:
   receiving means for receiving a television broadcast signal;
   a viewer control means including
   a channel selector coupled to said means for receiving a television broadcast signal;
   a data collection unit for coupling said receiving means to the television broadcast receiver, said data collection unit including a microprocessor and memory means for storing programming information for said microprocessor and for storing data;
   said viewer control means being monitored by said microprocessor which stores data representing the state of said viewer control means in said memory means;
   an optical reader associated with said data collection unit and for use by a panelist to scan data, said data being stored in said memory means under control of said microprocessor;
   means for coupling said data collection unit to the switched telephone network; and
   means for periodically establishing telephone communication between said data collection unit and the central location, whereby data stored in said memory means is transferred under control of said microprocessor to the central location.

2. A remote unit in accordance with claim 1 wherein said receiving means for receiving a television broadcast signal comprises a cable converter for connection to a cable system.

3. A remote unit in accordance with claim 2 wherein said optical reader is a bar code reader.

4. A remote unit in accordance with claim 3 wherein said bar code reader is adapted to read universal product codes, for storing in said memory data as to product purchases by a panelist.

5. A remote unit in accordance with claim 2 wherein said viewer control means includes a plurality of mode select switches for selecting one of a plurality of modes for use of the television receiver, and wherein said microprocessor is responsive to selection of a particular mode to tune the cable converter to an appropriate channel for the selected mode and to store in memory an indication of the mode selection.

6. A remote unit in accordance with claim 2 wherein said data collection unit is responsive under control of said microprocessor to enter a channel lock condition upon selection of a first predetermined channel by said channel selector, whereby the cable converter under microprocessor control stays tuned to whatever channel is currently selected despite further changes in said channel selector, and wherein selection of a second predetermined channel by said channel selector exits the channel lock condition, the events of entering and exiting the channel lock condition being stored in said memory as events, and any channel numbers selected while in the channel lock condition also being stored in said memory as events.

7. A remote unit in accordance with claim 2 wherein said data collection unit includes a receive only interface for receiving channel substitution data via a communication channel over a cable system, wherein each respective remote unit has identification data stored in said memory and wherein each respective remote unit is responsive to the presence of its identification data in the channel substitution data under control of said microprocessor to store same in said memory, and wherein said microprocessor controls the cable converter to effect channel substitution at selected predetermined times in accordance with the stored channel substitution data.

8. A remote unit in accordance with claim 2 wherein said memory is adapted to receive from the central location during telephone communications therewith and to store data in the form of alphanumeric characters, and wherein said data collection unit includes means under control of said microprocessor for generating on the television receiver a display of the data in the form of alphanumeric characters.

9. A remote unit in accordance with claim 8 wherein said viewer control means includes a means for inputting to said data collection unit responses of a panelist to said display of alphanumeric characters, which responses are stored in said memory means.

10. A remote unit in accordance with claim 8 wherein said data collection unit includes a mode selector for selecting a television receiver display function wherein said alphanumeric data is displayed on the television receiver, and wherein said microprocessor is responsive to selection of the display function to tune the cable converter to an appropriate channel for the display function and to generate a display on the television receiver in accordance with the alphanumeric data stored in said memory.

11. A remote unit in accordance with claim 10 wherein upon selection of the display function said data collection unit is responsive under control of said microprocessor to enter a channel lock condition whereby the cable converter under microprocessor control stays tuned to the appropriate channel for the display function despite further changes in said channel selector by a panelist, and wherein selections of channel numbers by a panelist in response to the display are stored in said memory means as an indication of panelist response to said alphanumeric data.

12. A remote unit in accordance with claim 11 wherein said alphanumeric data comprises market research survey data.

13. A remote unit in accordance with claim 12 wherein said data collection unit includes a visible indicator under control of said microprocessor for providing a visible indication of the presence in said memory of market research survey data to alert a panelist to the presence of same.

14. A remote unit in accordance with claim 1 wherein said means for coupling said data collection unit to the switched telephone network comprises a modem and a telephone block interface.

15. A remote unit in accordance with claim 14 wherein said telephone block interface includes means for intercepting all incoming telephone calls under control of said microprocessor during a predetermined time window, and for otherwise not affecting incoming telephone calls outside of said time window.

16. A remote unit in accordance with claim 15 wherein said telephone block interface is enabled during said time window to prevent ringing of a panelist's telephone receivers by an incoming call, to interrogate under microprocessor control an incoming telephone call to determine if it is from the central location, and to respond to the central location if it is and to disconnect the incoming call if it is not from the central location.

17. A remote unit in accordance with claim 16 wherein telephone calls received during said time window which are not from the central location and which are thus disconnected, under microprocessor control inhibit said time window for a predetermined time to allow incoming calls to reach a panelist's telephone receiver.

18. A remote unit in accordance with claim 17 wherein said remote unit comprises a plurality of data collection units, each respectively associated with a plurality of television receivers at a panelist location, and wherein each of said data collection units is coupled to a telephone system at the panelist location, whereby communication between the plurality of data collection units is via telephone wiring at the panelist location.

19. A system for collecting data with respect to cooperating television viewers or panelists comprising a central computer facility and a plurality of remote units at a respective plurality of panelist locations, each of said remote units including:

receiving means for receiving a television broadcast signal;

a viewer control means including at least a channel selector coupled to said means for receiving a television broadcast signal;

a data collection unit for coupling said receiving means to a television broadcast receiver, said data collection unit including a microprocessor and memory means for storing programming information for said microprocessor and for storing data;

said viewer control means being monitored by said microprocessor which stores data in said memory means representing changes in said viewer control means;

an optical reader associated with said data collection unit and for use by a panelist to scan data, said data being stored in said memory means under control of said microprocessor;

means for coupling said data collection unit to the switched telephone network; and means for periodically establishing telephone communication between each of the respective data collection units and said central computer facility, whereby data stored in said memory means is transferred under control of said microprocessor to said central computer facility.

20. A system in accordance with claim 19 wherein said receiving means for receiving a television broadcast signal comprises a cable converter for connection to a cable system and said optical reader comprises a bar code reader.

21. A system in accordance with claim 20 wherein each of said data collection units includes a receive only interface for reviewing channel substitution via a communication channel over a cable system, wherein each respective remote unit has identification data stored in said memory and wherein each respective remote unit is responsive to the presence of its identification data in the channel substitution data under control of said microprocessor to store same in said memory, and wherein said microprocessor controls the cable converter to effect channel substitution at selected predetermined times in accordance with the stored channel substitution data.

22. A system in accordance with claim 21 wherein said memory of each of said data collection units is adapted to receive from the central location during telephone communications therewith and to store data in the form of alphanumeric characters, and wherein each of said data collection units includes means under control of said microprocessor for generating on the receptive associated television receiver a display of the data in the form of alphanumeric characters.

23. A system in accordance with claim 22 wherein said viewer control means of each of said data collection units includes a means for inputting to said data collection unit responses of a panelist to said display of alphanumeric characters, which responses are stored in said memory means.

24. A method of collecting data from a plurality of cooperating panelists at a plurality of remote locations comprising the steps of:

provided at each remote location receiving means for receiving a television broadcasting signal for use with an associated television broadcast receiver;

providing at each remote location a viewer control means coupled to the receiving means including at least a channel selector;

providing at each remote location an optical reader for use by a panelist to scan data;

monitoring the viewer control means and storing data indicative of changes therein; and periodically establishing telephone communications between a central location and each of the remote locations for transferring stored data with respect to the viewer control means and data optically scanned by a panelist to the central location.

25. A method in accordance with claim 24 including the step of storing data optically scanned in by a panelist with the optical reader.

26. A method in accordance with claim 25 wherein the optical reader which is provided is a bar code reader for scanning products purchased by a panelist.

27. A method in accordance with claim 24 including the step of transmitting to each remote location during telephone communication with the central location market survey information and storing the information at the remote location and providing means under control of a panelist for calling up an displaying the information; and providing means for panelists input of responses to the information; and storing the panelist responses to the information for communication to the central location.

* * * * *